March 19, 1968
L. S. BIALKOWSKI
3,373,998
DIAPHRAGM SEAL WITH A TUBULAR EXTENSION
CARRYING THE SEALING EDGE
Filed Oct. 14, 1965
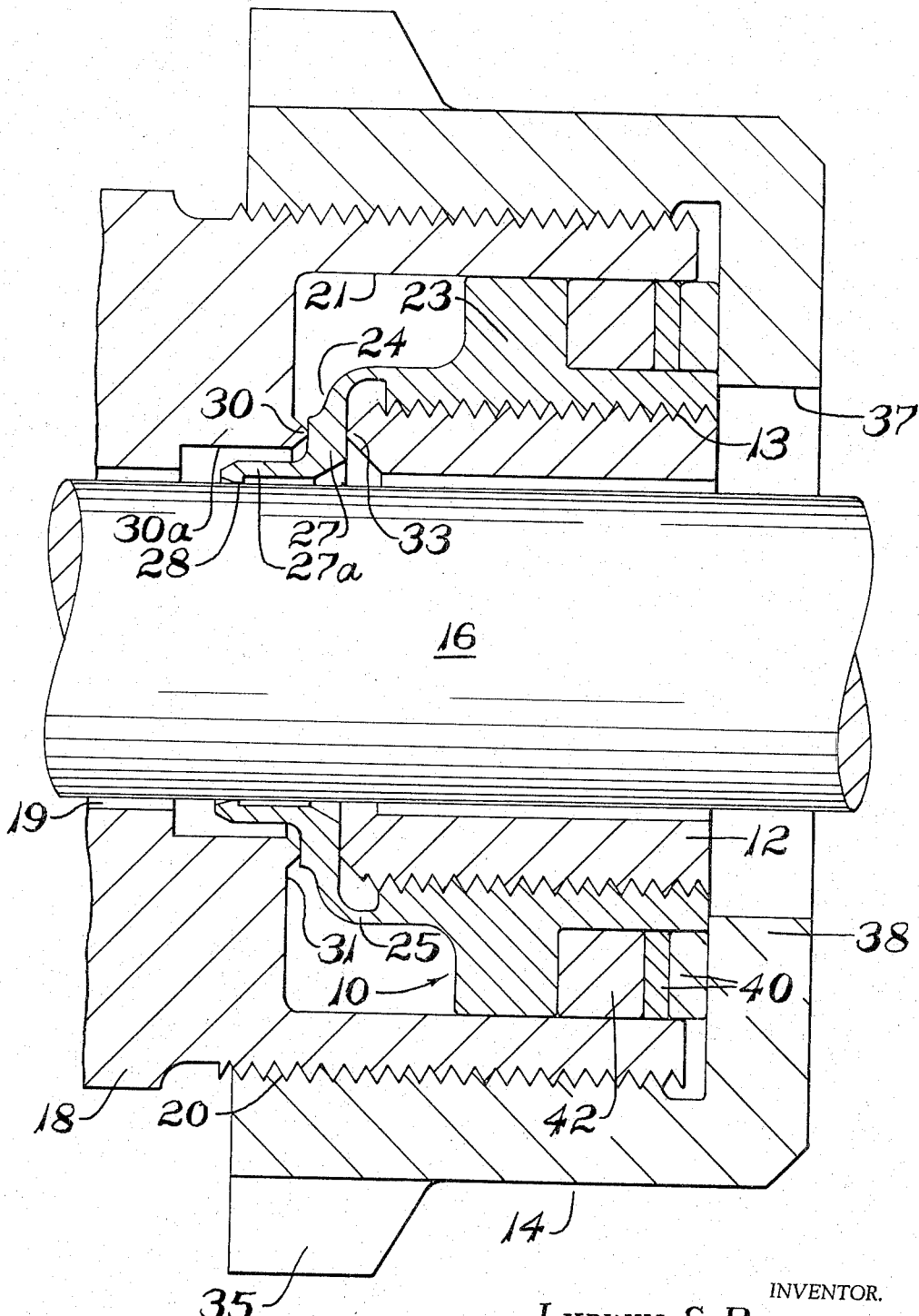
INVENTOR.
LUDWIK S. BIALKOWSKI
BY John D. Haney
ATTY.

United States Patent Office 3,373,998
Patented Mar. 19, 1968

3,373,998
DIAPHRAGM SEAL WITH A TUBULAR EXTENSION CARRYING THE SEALING EDGE
Ludwik S. Bialkowski, Troy, Ohio, assignor to The B. F. Goodrich Company, New York, N.Y., a corporation of New York
Filed Oct. 14, 1965, Ser. No. 495,778
10 Claims. (Cl. 277—110)

ABSTRACT OF THE DISCLOSURE

A diaphragm-type fluid pressure seal useful for static reciprocating or rotary service on rods or in cylinders has its annular sealing edge formed on a tubular extension of the diaphragm which is generally concentric with the surface against which the seal is made. Deflection of the diaphragm alters the circumferential length of the sealing edge and therefore the sealing load. Although the seal is rigid and preferably of metal, the tubular extension has adequate flexibility so that it can conform to non-circularity, eccentricity and is better able to withstand side loads or wobble motions of the part engaged by the sealing edge.

---

This invention relates to fluid pressure seal assemblies for hydraulic equipment.

The seal assemblies of this invention are basically diaphragm seal assemblies as disclosed and claimed in my pending application Ser. No. 424,678 (now U.S. Patent No. 3,264,005) but include additional structural features to provide for improved operation in sealing against rods or cylinders which are other than perfectly circular in cross section. With the present invention an effective seal with substantially uniform interface sealing pressure may be made on rods, shafts or cylinders (even when rotating) without the necessity for expensive machining operations to "true" the cross sectional circularity of these machine parts. Additionally the seal assemblies of this invention more effectively accommodate side loads imposed on the rods or cylinders, or wobbling motions of a rotating shaft. The invention particularly includes an improved sealing ring used as an element in these new seal assemblies.

Like the diaphragm seal assemblies of my aforesaid patent application, these improved seal assemblies are useful in either static, reciprocating, or rotary service; or under service conditions wherein the relative dynamic motion is a combination of rotary and reciprocating motion. The basic components of an improved seal assembly include a sealing ring, with an internal adjusting sleeve, and an external loading nut. These components may be made entirely of metal which advantageously enables their satisfactory operation over an extremely wide temperature range, or they may be made of rigid non-metallic materials, depending on the required service conditions. The selection of the materials in any given service is based on accepted engineering principles as to the mechanical strength required and the pressure, temperature changes and chemical nature of the fluid pressure medium acting on the seal assembly.

A seal assembly according to this invention includes an annular sealing ring which fits concentrically with a cylindrical surface of a machine part on which a seal is desired. The sealing ring has a rigid annular body and a stiff rigid annular sealing diaphragm integral with the body along a thin annular flexible zone at the junction of the diaphragm with the annular body, so that the diaphragm is capable of axial deflection relative to the body. The diaphragm is further provided with a tubular extension on the extremity of which there is an annular sealing edge. The tubular extension is stiff in its lengthwise direction but since it is very thin, it is flexible in its circumferential direction, and it projects axially from the diaphragm substantially concentric with the associated machine part engaged by its sealing edge. The circumference of the sealing edge may be changed (i.e. either lengthened or shortened) to urge it into sealing engagement with the associated machine part, by axial deflection of the diaphragm relative to the annular body of the ring.

The annular sealing ring may be made with its sealing edge of a diameter such that when the diaphragm of the sealing rings is in its free undeflected stated, the sealing edge may be fitted loosely with the adjoining cylindrical surface of the associated machine part. In other embodiments of the invention the sealing edge may be initially made of a diameter such that when the diaphragm is in its free undeflected state, the sealing edge cannot be fitted concentrically with the cylindrical surface because of interference between the surface and the sealing edge. In either case the other components of the assembly function to deflect the diaphragm to change the circumference of the sealing edge so that it tightly engages the adjoining cylindrical surface to provide a seal.

Owing to the circumferential flexibility of the tubular extension on the diaphragm, the extension easily becomes oval shaped or otherwise assumes a cross section shape other than circular so that the sealing edge is able to conform itself to the particular shape of the adjoining mating part which is not perfectly round. Also the circumferential flexibility of the tubular extension provides for maintaining effective sealing engagement with a substantially uniform interface or sealing load pressure during relative movement. The flexibility of the tubular extension also better accommodates severe side loads or lateral vibration of the member engaged by the sealing ring. The circumferential flexibility of the tubular extension can be varied at will by approprite material selection or by the dimensions selected for its wall thickness and the length of the tubular extension.

Further features of the invention will be explained with reference to the accompanying drawing which shows a preferred seal assembly as one example of how this invention may be practiced. The drawing more particularly shows a diametrical cross sectional view of a seal assembly suitable for either a static, reciprocating or rotary rod.

Referring to the drawing, the main parts of the seal assembly include a sealing ring 10, a seal-adjusting sleeve 12 which is in threaded engagement at 13 with the seal ring 10, and a loading nut 14. The sealing ring 10 together with adjusting sleeve 12 are concentric with a rod 16 which may be statically mounted, or which may be mounted for reciprocation or rotation relative to a casing 18 containing fluid under pressure such as hydraulic fluid. Ordinarily in a mechanism of this kind the rod 16 will be mounted for reciprocation and it is in reciprocating service that these seals have special utility.

In the assembly illustrated, the fluid pressure medium surrounds the leftward regions of the rod 16 inside casing 18 and communicates with the seal ring 10 through a narrow clearance space 19 between the casing 18 and the rod 16 to exert a rightward force against the seal assembly. The loading nut 14 of the seal assembly is in threaded engagement with the outside end of casing 18 at thread 20 to resist such force. The sealing ring 10 has a sliding fit inside an annular bore 21 at the mouth of the casing 18.

Sealing ring 10 consists of a rigid annular body ring 23 and a sealing diaphragm 24. Diaphragm 24 is joined integrally to the body ring 23 by a slender flexible annular neck 25. The entire diaphragm including the neck region is circumferentially continuous and the diaphragm itself is a solid rigid member except for its annular flexible neck region 25.

The diaphragm 24 is directed inwardly toward the rod 16 and near its radially inner margin the diaphragm includes a thick annular portion 27. Integral with portion 27 is a thin tubular sleeve-like extension 27a which concentrically surrounds rod 16 for a significant length and which terminates in an inwardly directed sealing edge 28. The sealing edge 28 is preferably in the form of a very narrow annular cylindrical surface, in the order of 0.005 inch in width. Alternatively, the sealing edge 28 may be slightly rounded or it may be quite sharp. The preferred design objective is for the sealing edge to effect a substantially line contact sealing engagement with the rod 16, so that the shape of the sealing edge may vary somewhat within the scope of this criterion. Ordinarily a very narrow cylindrical surface is convenient to manufacture. The term "knife" edge is sometimes used in this specification to describe the shape of the sealing edge and this term is intended to include either cylindrical, rounded or highly sharpened edge forms.

The annular sealing edge 28, being at the extremity of extension 27a, is offset both radially and axially from the junction of the thin neck portion 25 of the diaphragm with the annular body portion 23 of the sealing ring. Therefore, when the diaphragm is deflected axially relative to the annular body 23 along the flexible zone 25 as hereinafter explained, the tubular extension 27a is in turn deflected and the diameter of the annular sealing edge 28 is altered appropriately to cause the edge 28 to grip rod 16 tightly.

The drawing shows the assembly in fully installed operating position, with the sealing edge 28 of the diaphragm tightly engaging the rod 16 to form a fluid tight pressure seal. The diaphragm 24 is held in this assembly tightly jammed against an annular ridge 30 formed on a shoulder portion 31 of casing 18 at the bottom of its bore 21. Ridge 30 engages the thick annular marginal region 27 of the diaphragm radially outward from the sealing edge 28. The tubular extension 27a extends concentrically through the region bounded by annular ridge 30 and there is appreciable radial clearance between the outside surface of extension 27a and the adjoining wall 30a of the casing. The opposite side of the thick annular marginal region 27 is in pressure engagement with the blunt forward edge 33 of the adjusting sleeve 12 which is threaded tightly through threads 13 in the body 23 of the sealing ring. The adjusting sleeve 12 has substantial sliding clearance between its internal diameter and the rod 16 to provide for its movement axially of rod 16 when sleeve 12 is tightened against the margin 27. The opposite or outwardly directed end of loading nut 14 has slots 35 for the reception of a spanner wrench or a similar tool in order to turn the sleeve in its thread relative to body 23. The ring body 23 is forced leftward into bore 21 to maintain engagement of the diaphragm 24 with the annular ridge 30 by the loading nut 14 which is threaded onto the external thread 20 of the casing 18.

Loading nut 14 has a center hole 37 through which the adjusting sleeve 12 projects. A radial region 38 of this nut 14 bears tightly against the body 23 of the sealing ring 10 and also against spacer rings 40 and a metallic O-ring 42 which encircles body 23 of the sealing ring 10. The metal O-ring 42 is deformed by nut 14 and the spacer rings 40 into sealing engagement with the bore 21 and thereby provides a static seal to prevent leakage of fluid between the outer diameter of body 23 and bore 21.

When the assembly is fully installed the main fluid pressure seal (either static or dynamic) is provided by the engagement of the edge 28 with the rod 16. The pressure engagement of marginal region 27 with ridge 30 provides a partial seal but should pressure accumulate in the bottom of bore 21 in the region radially outward from ridge 30, it will be sealed against leakage by the O-ring 42 and spacer ring assembly 40.

The thin slender annular neck region 25 of the diaphragm 24 allows for axial deflection of the diaphragm 24 relative to the body 23, and at least some limited radial deflection of it if the rod 16 should be subjected to non-axial loads. The flexibility of the diaphragm 24 in this respect together with the circumferential flexibility of the tubular extension advantageously protects the sealing edge 28 from being damaged by such loads on the rod.

The sealing edge 28 of the diaphragm 24 may be brought into sealing engagement with the rod 26 by either of two different assembly techniques, depending on the initial size of the sealing edge 28.

According to one assembly technique, the annular sealing edge 28 is made so that in its free undeflected state before the sealing ring is installed, the diameter of the annular sealing edge 28 is slightly larger than the diameter of the rod 16. Accordingly the sealing ring 10 can be slipped easily over the rod 16. In this method of assembly, preferably the adjusting sleeve 12 is first threaded partially into thread 13 so that its end 33 does not engage the diaphragm margin 27. After the parts are assembled loosely on rod 16, the sealing ring is loaded by tightening loading nut 14 to force the sealing ring axially into bore 21 and jam the diaphragm margin 27 forcibly against ridge 30 on the casing 18. Ridge 30 operates somewhat like an annular fulcrum to deflect the diaphragm axially toward the annular body 23 by bending the diaphragm along its annular flexible zone 25 in response to the force applied by the loading nut 14. As a result of this deflection the tubular extension 27a is also deflected (both lengthwise and circumferentially) so that the sealing edge 28 is radially constricted or reduced in circumference until it is in tight pressure engagement with the rod 16. The loading nut 14 may be tightened on thread 20 as desired to obtain the desired sealing load between sealing edge 28 and rod 16.

It has been found with this form of seal that, in general, the sealing load which is developed between the sealing edge 28 and the rod 16 is substantially a linear function of the "break-out" force of the rod 16 when engaged by the seal. By "break-out" force is meant the force required to overcome the initial restraining force of the seal on the rod 16. Therefore by tightening nut 14 until a predetermined break-out force exists on rod 16 (which is easily and conveniently measured), the desired sealing load at edge 28 may be obtained with a high degree of accuracy. After loading nut 14 is tightened to the extent desired, the adjusting sleeve 12 is then threaded through its thread 13 to bring its forward edge 33 tightly against the opposite side of the annular margin 27 of the diaphragm, to stabilize the diaphragm and prevent it from chattering as the rod is reciprocated or otherwise moved. The break-out force and therefore the unit sealing load on the sealing edge 28 can be modified or adjusted within a fine range by the extent to which the adjusting sleeve 12 is tightened.

A second or alternate installation method differs from the first procedure primarily in that the sealing ring 10 is made so that in its neutral or free undeflected state, the diameter of its annular sealing edge 28 is made slightly smaller than the diameter of rod 16.

The first step in this alternate assembly procedure is to thread adjusting sleeve 12 into body 23 of the sealing ring and tighten the sleeve 12 until it axially deflects the diaphragm 24 forwardly, away from body 23 of the sealing ring. This deflection of the diaphragm tends to deflect the tubular extension 27a and to circumferentially expand the length (and therefore the diameter) of sealing edge 28. Sleeve 12 is accordingly tightened until the diameter of edge 28 will slide easily along rod 16. Then the sealing ring 10 together with the tightened sleeve 12 is assembled around rod 16 and inside bore 21, and loading nut 14 is tightened against the sealing ring to press the marginal region 27 of diaphragm 24 against ridge 30.

At this stage in the assembly, the sealing edge 28 will be larger in diameter than rod 16 so that there will be no sealing engagement with the rod 16. However, after nut 14 is initially tightened, the position of sleeve 12 is readjusted by turning it with a wrench in a direction to back the sleeve 12 axially away from diaphragm 24. Owing to the resilience of the diaphragm 24 in its neck region 25 and the tubular extension 27a, the diaphragm will tend to spring back axially toward body 23 as sleeve 12 is readjusted, and the diameter of its sealing edge 28 will accordingly contract into sealing engagement with rod 16.

By this method of assembly the unit sealing load at the sealing edge 28 can be very accurately controlled by adjusting the position of sleeve 12. It will be ordinarily convenient to determine the sealing load imposed on rod 16 by measuring the break-out force of rod 16.

When sleeve 12 is unscrewed to the point that the desired sealing load/break-out force is obtained, then load nut 14 can be retightened if necessary to lock the seal assembly so that it thereafter continues to operate according to the preset sealing load.

In static service, if the rod 16 is slightly out of round at the point where the sealing edge 28 engages it, the tubular extension and the edge 28 will assume the cross sectional shape of the rod and exert substantially uniform sealing pressure on the rod. In dynamic service the sealing edge and the tubular extension 27a are flexible circumferentially sufficiently to change their shape slightly to conform to imperfections in the circularity of the rod 16 as the rod moves relative to the sealing edge, either in reciprocation or in rotary movement.

Various embodiments of the seal assembly and the method of installation may be made within the scope of the appended claims.

What is claimed is:

1. A seal assembly comprising:
   (A) two machine parts, one of which presents a cylindrical surface to the other;
   (B) an annular rigid sealing ring concentric with said surface and having
      (1) a stiff annular body, and
      (2) a stiff annular diaphragm integral with the body which is resiliently deflectable axially of the body, and
      (3) a tubular extension on said diaphragm extending axially of the body on which there is a circumferentially continuous sealing portion presented to said cylindrical surface of said one part;
   (C) a sleeve engaged with the body of said ring for adjustment axially of the body toward a position in which one end of said sleeve is engageable with said diaphragm to regulate the extent of the diaphragm's deflection axially of the body and therefore the sealing engagement of said sealing region with said cylindrical surface of said one machine part, and
   (D) means for engaging the body of said sealing ring to the other of said machine parts.

2. A seal assembly comprising radially spaced inner and outer concentric machine parts one of which presents a cylindrical surface to the other, an annular rigid sealing ring between said parts, said ring having a stiff annular body and a stiff annular diaphragm integral therewith is circumferentially continuous and which is joined to the annular body along an annular resiliently deflectable zone of the diaphragm and which terminates in a tubular extension extending axially of said body on which extension there is a circumferentially continuous sealing edge presented to said cylindrical surface of said one part; an adjusting sleeve engaged with said body for axial adjustment relative to the body toward a position in which said sleeve engages said diaphragm to regulate the extent of deflection of said diaphragm axially of the body, and therefore the sealing contact of said sealing edge with said cylindrical surface, and a loading nut for maintaining said sealing ring in engagement with the other of said machine parts.

3. A seal assembly comprising a part having a cylindrical surface, an annular rigid sealing ring having a stiff annular body and a stiff annular diaphragm integral therewith which diaphragm terminates in an annular margin on which there is a circumferentially continuous tubular extension extending axially of the body generally concentric with said cylindrical surface on which there is a sealing portion presented to said cylindrical surface, said diaphragm being disposed generally radially of said cylindrical surface and being resiliently deflectable axially of said body along an annular zone of the diaphragm which joins it to said body to deflect said tubular extension and thereby vary the circumferential length of said sealing portion, and means for maintaining said diaphragm axially deflected relative to said body to resiliently deform said sealing portion into pressure sealing engagement with said cylindrical surface, and means including a sleeve engaged with said body for axial adjustment relative to the body toward and away from said annular margin of said diaphragm.

4. A seal assembly according to claim 3 wherein said tubular extension is stiff but resiliently flexible circumferentially to enable said sealing region to conform to non-circular irregularities in the curvature of said cylindrical surface.

5. A seal assembly according to claim 4 wherein the components of said assembly are metal.

6. A seal assembly comprising a part having a cylindrical surface, an annular rigid sealing ring having a stiff annular body and a stiff annular sealing diaphragm integral therewith which diaphragm is deflectable axially relative to said body and terminates in an annular margin on which there is a circumferentially continuous tubular extension extending axially of the body generally concentric with the cylindrical surface of a part with which the seal is associated, the extension having a sealing edge at the extremity of the extension away from the diahpragm, means for supporting said annular body with said diaphragm disposed generally radially of said cylindrical surface and with said sealing edge presented to said cylindrical surface, means on said supporting means locally engaging said diaphragm at one side of said margin, an adjusting sleeve in threaded engagement with said body and locally engaging the opposite side of said margin, and a loading nut in threaded engagement with said body-supporting means and bearing on said annular body, said means engaging said diaphragm, and said adjusting sleeve, and said loading nut mutually cooperating to regulate the extent to which said diaphragm is axially deflected relative to said body and therefore the sealing engagement of said sealing edge with said cylindrical surface.

7. A seal assembly according to claim 6 wherein said annular margin of said diaphragm is materially thicker than the remaining regions of said diaphragm and said extension and wherein said diaphragm is deflectable relative to said body along a thin annular zone of the diaphragm connecting the diaphragm to said body.

8. A sealing ring assembly comprising a ring including an annular rigid body having an integral stiff annular sealing diaphragm extending transversely to the body, and a tubular extension on said diaphragm extending coaxially of the body and on which tubular extension there is a circumferentially continuous sealing portion radially offset from said body, said diaphragm being resiliently deflectable relative to said body without distorting the body to deflect the tubular extension and thereby resiliently alter the free circumferential length of said sealing portion so that said portion is capable of providing sealing engagement with an adjoining annular surface; and a sleeve engaged with the body for adjustment axially of the body toward a position in which one end of the sleeve is engageable with the diaphragm for regulating the axial deflection of said diaphragm.

9. A sealing ring comprising an annular rigid body having an integral stiff annular sealing diaphragm extending transversely to the body, said diaphragm including an annular flexible neck region thinner than the remaining portions of the diaphragm at its junction with said body, and a tubular extension on the thicker region of said diaphragm extending coaxially of the body and on which tubular extension there is a circumferentially continuous sealing edge, said diaphragm being resiliently deflectable axially relative to said body without distorting the body to deflect the tubular extension and thereby resiliently alter the free circumferential length of said sealing edge so that said edge is capable of providing sealing engagement with an adjoining surface mating with said edge.

10. An annular metal sealing ring comprising an annular rigid body having an integral stiff annular sealing diaphragm, said diaphragm including a thin annular zone at its junction with said body and a thicker annular portion extending radially of said body, and a tubular extension on the thick zone of said diaphragm axial of said body terminating in a circumferentially continuous sealing edge radially offset from said body, said diaphragm being resiliently deflectable axially relative to said body without distorting the body along said thin annular zone of said diaphragm to deflect the tubular extension and thereby resiliently alter the free circumferential length of said sealing edge.

References Cited

UNITED STATES PATENTS

| | | | |
|---|---|---|---|
| 2,405,152 | 8/1946 | Kilchenmann | 277—212 |
| 2,693,375 | 11/1954 | Wurzburger | 277—212 X |
| 3,003,795 | 10/1961 | Lyon | 277—236 XR |
| 3,264,005 | 8/1966 | Bailkowski | 277—110 X |

LAVERNE D. GEIGER, *Primary Examiner.*

J. S. MEDNICK, *Assistant Examiner.*

UNITED STATES PATENT OFFICE
CERTIFICATE OF CORRECTION

Patent No. 3,373,998                      March 19, 1968

Ludwik S. Bialkowski

It is certified that error appears in the above identified patent and that said Letters Patent are hereby corrected as shown below:

Column 2, line 11, for "rings" read -- ring --; column 5, line 60, after "therewith" insert -- which --; column 6, line 4, for "tabular" read -- tubular --.

Signed and sealed this 8th day of July 1969.

(SEAL)
Attest:

Edward M. Fletcher, Jr.

Attesting Officer

WILLIAM E. SCHUYLER, JR.

Commissioner of Patents